United States Patent [19]

Reddy

[11] Patent Number: 6,045,853
[45] Date of Patent: Apr. 4, 2000

[54] FAT CONTINUOUS SPREAD AND PROCESS FOR MAKING THE SAME

[75] Inventor: Podutoori Ravinder Reddy, Columbia, Md.

[73] Assignee: Lipton, Division of Conopco, Inc., Englewood Cliffs, N.J.

[21] Appl. No.: 08/985,559

[22] Filed: Dec. 5, 1997

[51] Int. Cl.[7] ...................................................... A23D 7/02
[52] U.S. Cl. ........................................... 426/603; 426/602
[58] Field of Search ..................................... 426/602, 603

[56] References Cited

U.S. PATENT DOCUMENTS

| | | | |
|---|---|---|---|
| 4,103,037 | 7/1978 | Bodor | 426/575 |
| 4,305,970 | 12/1981 | Moran | 426/573 |
| 4,513,017 | 4/1985 | Moran | 426/603 |
| 4,536,408 | 8/1985 | Morehouse | 426/250 |
| 4,849,243 | 7/1989 | Sreenivasan | 426/602 |
| 4,869,919 | 9/1989 | Lowery | 426/603 |
| 4,882,187 | 11/1989 | Izzo | 426/602 |
| 4,917,915 | 4/1990 | Cain et al. | 426/603 |
| 5,169,668 | 12/1992 | Milo | 426/603 |
| 5,352,475 | 10/1994 | Tholl | 426/603 |
| 5,451,422 | 9/1995 | Cain | 426/573 |
| 5,464,645 | 11/1995 | Wesdorp | 426/603 |
| 5,472,728 | 12/1995 | Miller | 426/611 |
| 5,472,729 | 12/1995 | Larsson | 426/603 |
| 5,554,407 | 9/1996 | Bodor | 426/603 |

*Primary Examiner*—Carolyn Paden

[57] ABSTRACT

The invention relates to a process for preparing good quality low fat spreads (20–60%) more preferably in the range of 20–45% or 20–40% fat. This is achieved by the use of non gelling hydrocolloids to provide higher viscosity to the aqueous phase, however at a concentration which results in a water continuous emulsion. The emulsifier levels and types are chosen to result in a water continuous emulsion in the tank, while resulting in a fat continuous spread once hot inverted prior to cooling.

12 Claims, No Drawings

FAT CONTINUOUS SPREAD AND PROCESS FOR MAKING THE SAME

FIELD OF THE INVENTION

This invention relates to fat continuous low fat spreads of good quality. This invention also relates to a process for preparing low fat spreads of good quality.

BACKGROUND OF THE INVENTION

Fat continuous and very low fat spreads have been described in the literature. Two approaches have been followed to produce the low fat and very low fat spreads. One approach is to cool the fat continuous (water-in-oil) premix and produce a fat continuous (water-in-oil) spread. For spreads with less than 40% fat and in particular less than 30% fat, the level and type of emulsifiers are optimized to produce the fat continuous product. At these levels of emulsifiers, the quality of the product is poor due to higher stability of the emulsions which are difficult to invert in the mouth, affecting the salt and flavor release. Any attempts to destabilize the emulsion with destabilizing agents such as proteins, results in a water continuous premix and cannot be processed using conventional spread processes.

The second approach is to prepare a water continuous premix (oil-in-water) which in the presence of gelling agents is inverted to a fat continuous product (water-in-oil). The choice gelling agent is gelatin, a reversible gel which melts below the body temperature. An improvement in the salt and flavor release is possible if the process is optimized to produce an inverted (water-in-oil) product with some levels of the added proteins.

Fat continuous products wherein the aqueous phase contains a gelling agent and is gel forming are described in U.S. Pat. No. 4,917,915 (Cain et al). The gelling agents are selected from a gelling hydrolyzed starch derivative, gelatin, carrageenan and mixtures thereof. The hydrolyzed starch is generally defined as a gelling maltodextrin. Non-gelling starches are also described as present in the aqueous phase as bulking agents or viscosity enhancers. The process involves inverting the emulsion at colder temperatures <20° C.

Bodor et al. (U.S. Pat. No. 4,103,037) describes fat continuous products which also contain gelling agents, such as gelatin and Danish agar, in the aqueous phase. Bodor teaches that the type of gelling agent used in low fat continuous spread is critical since most gelling agents that can assist in the stabilization of the emulsions have too high a melting point and give a gluey unpleasant impression when chewed. The process involves inverting the emulsion at colder temperatures <20° C.

Bodor et al (U.S. Pat. No. 5,554,407) uses a process of cold mixing to process a water continuous emulsion to a fat continuous emulsion. The cold mixing of a fat continuous phase with an aqueous phase at <26° C. is taught in this patent.

Thus the above teaches us the inversion process where the emulsion is cooled prior to inverting a water continuous emulsion to a fat continuous emulsion and processed further resulting in finished spread which is fat continuous.

SUMMARY OF THE INVENTION

The invention relates to a process for preparing good quality low fat spreads (20–60% fat) more preferably in the range of 25–40% fat. This was achieved by the use of non gelling hydrocolloids to provide higher viscosity to the aqueous phase, however at a concentration which results in a water continuous emulsion. The emulsifier levels and types were chosen to result in a water continuous emulsion. Even though it is possible to phase invert via a cold inversion process when using non gelling hydrocolloids, this situation is not as stable and reliable when compared to the process where gelling hydrocolloids are used.

The invention is a process where the water continuous emulsion is phase inverted prior to the cooling step using a high speed C unit. The emulsion temperature was in the range of 45–65° C. It is called a hot inversion. What allows the emulsion to invert to fat continuous is the difference between the viscosity of the aqueous and the fat phases combined with a well balanced emulsifier system which allows the water continuous emulsion to be maintained in the tank while a fat continuous phase forms upon inversion.

In the hot inversion process of the invention, the rheological properties of the aqueous phase and the emulsifier system in the fat phase are important for the spreads to be stable at very low fat levels the resulting spreads have good organoleptic properties.

The invention also relates to fat continuous low fat spreads prepared by the above process.

DETAILED DESCRIPTION OF THE INVENTION

Unless otherwise indicated, as used herein, %, means % by weight.

The starting materials recited in this specification are either known or can be prepared by known methods.

Hydrocolloids used in the compositions of the invention include xanthan gum, guar gum, cellulose gum, carrageenan gum, locust bean gum, alginate, viscosifying starches native or modified (modified means chemically or physically modified), or mixtures thereof. Other food hydrocolloids are described in Food Hydrocolloids, Volumes 1, 2 and 3 Editor, Martin Glicksman, CRC Press Incorporated Boca Raton, Fla., 1982 and 1983 which is hereby incorporated by reference.

The mean aqueous phase droplet size distribution of the dispersed aqueous phase in the final product is less than about 20 microns, preferably less than about 10 microns and the amount of free water present is less than about 5%, preferably less than about 3%, most preferably 0%. Free water is defined as the water in a droplet of greater than 200 microns. The droplet size is determined by a method described in J. C. van den Enden, D. et al., J. Colloid., Interface Science 140(I) (1990) pp 105–113 which is herein incorporated by reference; and also described in U.S. Pat. No. 5,302,408 which also is herein incorporated by reference. As used herein, D3.3 stands for mean water droplet size distribution as measured in microns.

The emulsion stability can be determined by measuring the breakdown of margarine or spreads, at increased temperature. It is an important factor for assessing oral response. The method has a good correlation with panel taste assessments on oral response of refrigerated margarine or spreads.

The emulsion stability by conductivity test is a method described herein. In this test, the change in conductivity of a fat spread in distilled water is measured during heating the sample in distilled water at a rate of 1° C./minute, until the emulsion is totally broken-down.

The procedure for the method is as follows:

The sample is pretempered in a constant temperature cabinet at least three days before measuring. The temperature can be 5, 10, 15, 20 or 25° C., with 15° C. being the most widely used.

Fill the jacketed glass vessel (minimum inner diameter of 5.9 cm and a minimum inner height of 9.5 cm) with exactly 200 ml of distilled water. The jacketed vessel is placed on a magnetic stirrer which operates at 1000 rev/min. A stirring magnet of diameter 8.5 mm and a length of 38 mm is placed in the vessel. The temperature of the jacketed vessel is controlled by a programming equipment (Lauda model P120/25) which heats the water at a rate 1° C./min after equilibrating the water in the water bath temperature at 23° C. by recirculating the water through the jacket of the vessel.

Fill the glass syringe with about 2 g of the sample by pressing its wider opening into the sample and clean the outside. Weigh the filled syringe. Start the temperature programmer and the recorder. Inject the sample into the jacketed vessel when the water in the vessel has reached a temperature of 25° C. Weigh the syringe and note the amount of sample that has been injected together with the sample code and the measuring range on the recorder paper. The controlled increase of temperature is continued until the emulsion has broken down completely; the conductivity will increase according to the conductivity/temperature coefficient and the recorder will show a straight line. The conductivity is measured by measuring the conductance between two parallel plates of the conductivity cell (Philips, type 9512/01) immersed in the distilled water which is connected to a conductivity meter (Philips type 9501/01 or PW 9505). The temperature is measured by two thermocouples, one measuring the temperature in the vessel, one as cold junction, type Iron-constantan. The temperature and the conductivity are recorded on a two channel recorder and traced on a chart recorder.

$T_{100\%}$ or $T_{100}$ is the temperature at which 100% salt has been released, where the conductivity line is becoming linear after an initial non linear increase in conductivity with increasing temperature from the starting temperature of 25° C. or greater depending on the emulsion stability.

A fat continuous soft or stick margarine or spread of the invention can be prepared by the process of the invention, by combining an oil or fat phase and an aqueous phase. The desirable fat level in the final product can range from about 20–60 or more preferably, 20–50%.

Fat Components

Throughout this specification the terms oil and fat are used interchangeably. They are meant to include triglycerides from either vegetable or animal sources. Such vegetable triglycerides include soybean oil, sunflower oil, palm oil, palm kernel oil, both high and low erucic rapeseed oil, coconut oil, olive oil, sesame oil, peanut oil, corn oil and mixtures thereof.

Triglycerides from animal sources include fish oil, tallow, sardine oil, dairy fat and mixtures thereof.

The oils may be chemically, physically and/or genetically modified products such as hydrogenated, fractionated and/or inter-esterified triglyceride mixtures and mixtures of two or more thereof, as well as edible substances that are physically similar to triglycerides such as waxes, e.g. jojoba oil, and poly fatty acid esters mono-or disaccharides, that can be used as replacement for or in a mixture with triglycerides. Preferably, the fat contained in the present spreads consists essentially of triglycerides from a vegetable source, preferably physically or chemically modified or unmodified liquid oil and mixtures thereof.

The precise composition of the fat determines the final properties of the resulting spread. For organoleptic reasons, it is preferred to employ a fat that has a solid fat content at 35° C. of less than 5 wt. % (calculated on the weight of the fat), more preferably less than 3 wt. %. The solid fat content at 20° C. is suitably between 5 and 30 wt. %, preferably between 5 and 20 wt. %. At 5° C., the solid fat content is suitably between 5 and 50 wt. %, preferably between 10 and 40 wt. %.

The solid fat content can conveniently be determined by measuring the NMR N-value as described in Fette, Seifen, Anstrichmittel, 80 (1978), 180–186, which indicates the amount of fat present in the solid state expressed in percentage of the weight of the fat.

A typical triglyceride mixture that can suitably be used as fat in the present spread depends on the form of the final product such as stick, hard tub or soft tub. For example, a preferred fat mixture for a soft tub product may be a mixture of 20–90 wt. % liquid oil, (e.g. soybean oil) with 80–5 wt. % of a hardstock which is a mixture of randomly interesterified and/or hydrogenated oil.

The aqueous phase may include the following ingredients: dairy ingredients such as buttermilk, skim milk, milk, butter, yogurt, whey, caseinate, milk proteins, vegetable proteins, vitamins, and salt for taste and as a preservative.

Compositions of the invention may further comprise a dairy protein, or a combination of dairy proteins.

The aqueous phase may additionally contain preservatives such as potassium sorbate and sodium benzoate.

Compositions of the invention can have ingredients which fall within the following ranges:

| INGREDIENT | % |
| --- | --- |
| Oil blend mixture of liquid oil and hard stock (partially hydrogenated, fully hydrogenated, interesterified and fractionated oils) | 20–50 |
| Distilled monoglyceride IV= 5 | 0.05–0.5 |
| Distilled monoglyceride IV= 60 | 0.05–0.5 |
| Poly glycerol esters of fatty acids HLB 3-4 | 0.05–1.0 |
| Lecithin | 0.05–.5 |
| Sodium alginate | 0.1–3 |
| water and salt, preservatives, flavorings, and colorings | make up to 100 |

Process for preparing compositions of the invention:

The process for preparing fat continuous spreads of the invention comprises:
(a) preparation of a fat phase comprising a fat blend and an emulsifier or combination of emulsifiers that results in an oil-in water emulsion at greater than 40° C.;
(b) heating said oil-in-water emulsion to 40° to 65° C., if necessary;
(c) transferring said oil-in-water emulsion at about 40° to about 65° C. to an inverter unit and running at a speed resulting in inversion of the emulsion;
(d) transferring the resulting water-in-oil emulsion to one or more heat exchangers to cool the water-in-oil emulsion to 5° to 25° C.; and
(e) transferring the resulting composition to a crystallizing unit. to obtain a spread of a consistency to pack in a tub, or in the form of a stick.

It is understood that in the description below, an inverter can be an A-unit or a C-unit or any high shear unit. The crystallizing unit can be a B or a C unit. For soft products, a C unit is preferred. For stick products B-unit or a C-unit or a combination thereof is preferred.

The process for preparing compositions of the invention involves pumping the hot emulsion at 45°–65° C. to an inverter unit C1 at volume 11 liters, and then transferring it to a scraped surface heat exchanger A1 and then sending the resulting composition to a second crystallization unit C2.

EXAMPLE 1

What follows is a description of the ingredients used in the process of the invention:

| INGREDIENT | DESCRIPTION |
| --- | --- |
| Oil Blend for Tub products | Oil blend, combination of liquid bean oil and partially hydrogenated oil<br>N10 = 12–18<br>N20 = 4–9<br>N30 = 1–4<br>N35 = 0–1.5. |
| Myverol 1804 ® | Distilled monoglyceride, Iodine Value 5, from Quest |
| Dimodan OK ® | Distilled monoglyceride, iodine value 60 from Grindsted |
| Santone 3-4-0 ® | Poly glycerol esters of fatty acids HLB-3-4 from Quest |
| Keltone HV ® | Sodium alginate, from Kelco |
| Color and vitamin (Beta Carotene) | a mixture of beta carotene and vitamin A from Roche |
| Flavor | butter flavor |

The composition of Example 1 is as follows:

TABLE 1

| Ingredients | WT % |
| --- | --- |
| Oil phase: | 30.0 |
| Soft Oil Blend, untreated | 27.25 |
| Soft Oil Blend, for treating with the emulsifier | 2.00 |
| Myverol 1804 ® | 0.05 |
| Dimodan OK ® | 0.10 |
| Lecithin | 0.20 |
| SANTONE 3-4-0 ® | 0.40 |
| AQUEOUS PHASE | 70.0 |
| Salt | 1.20 |
| Keltone HV ® | 1.00 |
| Lactic | 0.08 |
| K-Sorbate | 0.12 |
| EDTA | 0.0080 |
| Beta Carotene (Color and Vitamin) | trace |
| Flavor | trace |
| Water | to make it to 100 |
| TOTAL | 100 |

The process was carried as follows:

Emulsion tank→Positive pump→C1→A1→C2→pack in tubs, where C1 is the inverter.

C1 rpm=800, C1 exit temp=53° C., volume, 11 liter

A1 rpm=400, A1 exit temp=7–10° C.

C2 rpm=500–700, C2 exit temp=13° C., volume, 11 liter

Throughput is 400 kg/hr.

The resulting product was a fat continuous spread comprising about 30% fat. The product was tested by using the emulsion stability test described elsewhere in this specification and found to have a $T_{100}$ of 40° C.

Other similar compositions could be prepared by one skilled in the art without departing from the general teachings of the invention. Such other compositions are considered to be within the scope of the present invention.

We claim:

1. A fat continuous low fat spread which comprises:

| INGREDIENT | % |
| --- | --- |
| Oil blend mixture of liquid oil and hard stock (partially hydrogenated, fully hydrogenated, interesterified and fractionated oils) | 20–50 |
| Distilled monoglyceride IV = 5 | 0.05–0.5 |
| Distilled monoglyceride IV = 60 | 0.05–0.5 |
| Poly glycerol esters of fatty acids HLB 3–4 | 0.05–1.0 |
| Lecithin | 0.05–0.5 |
| Sodium alginate | 0.1–3 |
| Water, salt, preservatives, flavorings, and colorings | Make up to 100 | which is made by (a) preparing a fat phase comprising a fat blend and an emulsifier or combination of emulsifiers that results in an oil-in-water emulsion at greater than 40° C.;

(b) heating said oil-in-water emulsion to 40° to 65° C.;

(c) transferring said oil-in-water emulsion at about 40° to about 65° C. to an inverter unit and running at a speed resulting in inversion of the emulsion;

(d) transferring the resulting water-in-oil emulsion to one or more heat exchangers to cool the water-in-oil emulsion to 5° to 25° C.; and (e) transferring the resulting composition to a crystallizing unit, to obtain a spread of a consistency to pack in a tub, or form into a stick.

2. A fat continuous spread according to claim 1, which comprises an aqueous phase in the range of about 60% to about 75%.

3. A fat continuous spread according to claim 1, which comprises a fat phase in the range of about 25% to about 40%.

4. A fat continuous spread according to claim 1, wherein emulsion stability of the spread is such that the $T_{100}$ is 45 or less.

5. A fat continuous spread according to claim 1, wherein emulsion stability of the spread is such that the $T_{100}$ is 42 or less.

6. A fat continuous spread according to claim 1, wherein emulsion stability of the spread is such that the $T_{100}$ is 40 or less.

7. A fat continuous spread according to claim 1, wherein the spread has a mean water droplet distribution of (D3.3) less than 20 microns.

8. A fat continuous spread according to claim 1, wherein the spread has a mean water droplet distribution of (D3.3) less than 15 microns.

9. A fat continuous spread according to claim 1, wherein the spread has a mean water droplet distribution of (D3.3) less than 10 microns.

10. A fat continuous spread according to claim 1, which further comprises a dairy protein, or a combination of dairy proteins.

11. A process for producing a fat continuous spread which comprises:

(a) preparing a fat phase comprising a fat blend and a non-gelling hydrocolloid and an emulsifier or combination of emulsifiers that results in an oil-in-water emulsion at greater than 40° C.;

(b) heating said oil-in-water emulsion to 40° to 65° C.;

(c) transferring said oil-in-water emulsion at about 40° to about 65° C. to an inverter unit and running at a speed resulting in inversion of the emulsion;

(d) transferring the resulting water-in-oil emulsion to one or more heat exchangers to cool the water-in-oil emulsion to 5° to 25° C.; and (e) transferring the resulting composition to a crystallizing unit to obtain a spread of a consistency to pack in a tub, or form into a stick wherein the fat continuous spread comprises:

| INGREDIENT | % |
| --- | --- |
| Oil blend mixture of liquid oil and hard stock (partially hydrogenated, fully hydrogenated, interesterified and fractionated oils) | 20–50 |
| Distilled monoglyceride IV = 5 | 0.05–0.5 |
| Distilled monoglyceride IV = 60 | 0.05–0.5 |
| Poly glycerol esters of fatty acids HLB 3–4 | 0.05–1.0 |
| Lecithin | 0.05–0.5 |
| Sodium alginate | 0.1–3 |
| Water, salt, preservatives, flavorings, and colorings | Make up to 100 |

12. A process according to claim 11, wherein the viscosity of the aqueous phase is 1.1 to 1000 times as great as the viscosity of the oil phase.

* * * * *